United States Patent [19]
Kinslow, Jr. et al.

[11] 3,860,375
[45] Jan. 14, 1975

[54] BLOW MOLDING APPARATUS

[75] Inventors: William G. Kinslow, Jr.; Paul A. Marchant, both of Kansas City, Mo.; Robert D. Bessier, Prairie Village; Robert X. Hafele, Overland Park, both of Kans.

[73] Assignee: Ethyl Development Corporation, Kansas City, Mo.

[22] Filed: Mar. 4, 1974

[21] Appl. No.: 447,826

Related U.S. Application Data

[63] Continuation of Ser. No. 232,666, March 8, 1972, abandoned.

[52] U.S. Cl. ......... 425/182, 425/186, 425/DIG. 203, 425/DIG. 206
[51] Int. Cl. ............................................. B29d 23/03
[58] Field of Search .......... 425/DIG. 203, DIG. 204, 425/DIG. 205, DIG. 206, DIG. 211, DIG. 213, 182, 186, 326 B

[56] References Cited
UNITED STATES PATENTS

| | | | |
|---|---|---|---|
| 3,115,673 | 12/1963 | Rudolph | 425/DIG. 204 |
| 3,344,471 | 10/1967 | Martelli | 425/DIG. 211 |
| 3,396,427 | 8/1968 | Raspante | 425/DIG. 211 |
| 3,402,431 | 9/1968 | Folgelberg et al. | 425/DIG. 205 |
| 3,566,441 | 3/1971 | Thorn et al. | 425/DIG. 213 |
| 3,596,315 | 8/1971 | Yoskikawa et al. | 425/DIG. 211 |
| 3,599,284 | 8/1971 | Osa et al. | 425/DIG. 211 |
| 3,614,807 | 10/1971 | Lagoutee | 425/DIG. 211 |
| 3,616,491 | 11/1971 | Vollers | 425/DIG. 205 |
| R25,290 | 12/1962 | Parfrey | 425/326 B |

FOREIGN PATENTS OR APPLICATIONS

| | | |
|---|---|---|
| 1,175,418 | 8/1964 | Germany |
| 1,479,348 | 1/1972 | Germany |
| 1,905,267 | 8/1970 | Germany |
| 1,921,379 | 11/1970 | Germany |
| 1,922,090 | 11/1970 | Germany |
| 1,930,075 | 12/1970 | Germany |

OTHER PUBLICATIONS

German Utility Model 1937084 dated February 9, 1966 by G. Mehnert.

*Primary Examiner*—Richard B. Lazarus
*Attorney, Agent, or Firm*—Donald L. Johnson; John F. Sieberth; E. Donald Mays

[57] ABSTRACT

A process and apparatus for blow molding hollow plastic articles. The apparatus includes a pair of mold transport assemblies, one positioned on either side of the head of a plastic parison extruder. The mold transport assemblies reciprocate to carry the mold halves under the parison extruder to receive the parison and return to separate blow stations. The device utilizes a cam and cam follower mechanism for opening and closing the mold halves. The apparatus is movable for the purpose of mold setup. After mold setup is complete, the apparatus is mounted on a fixed platform beneath the extruder. The platform is adjustable in all directions to provide alignment of the apparatus with the extruder.

14 Claims, 28 Drawing Figures

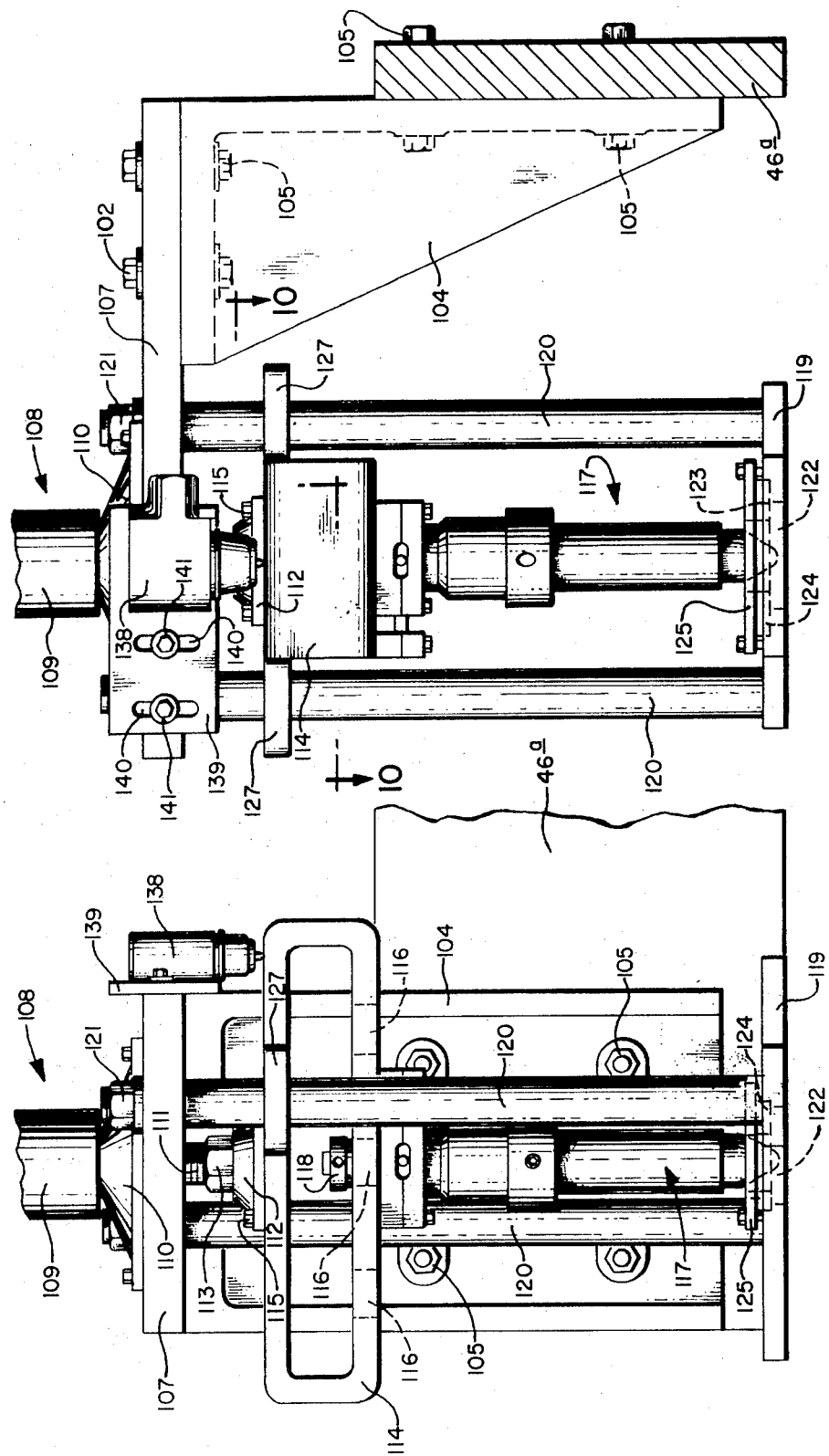

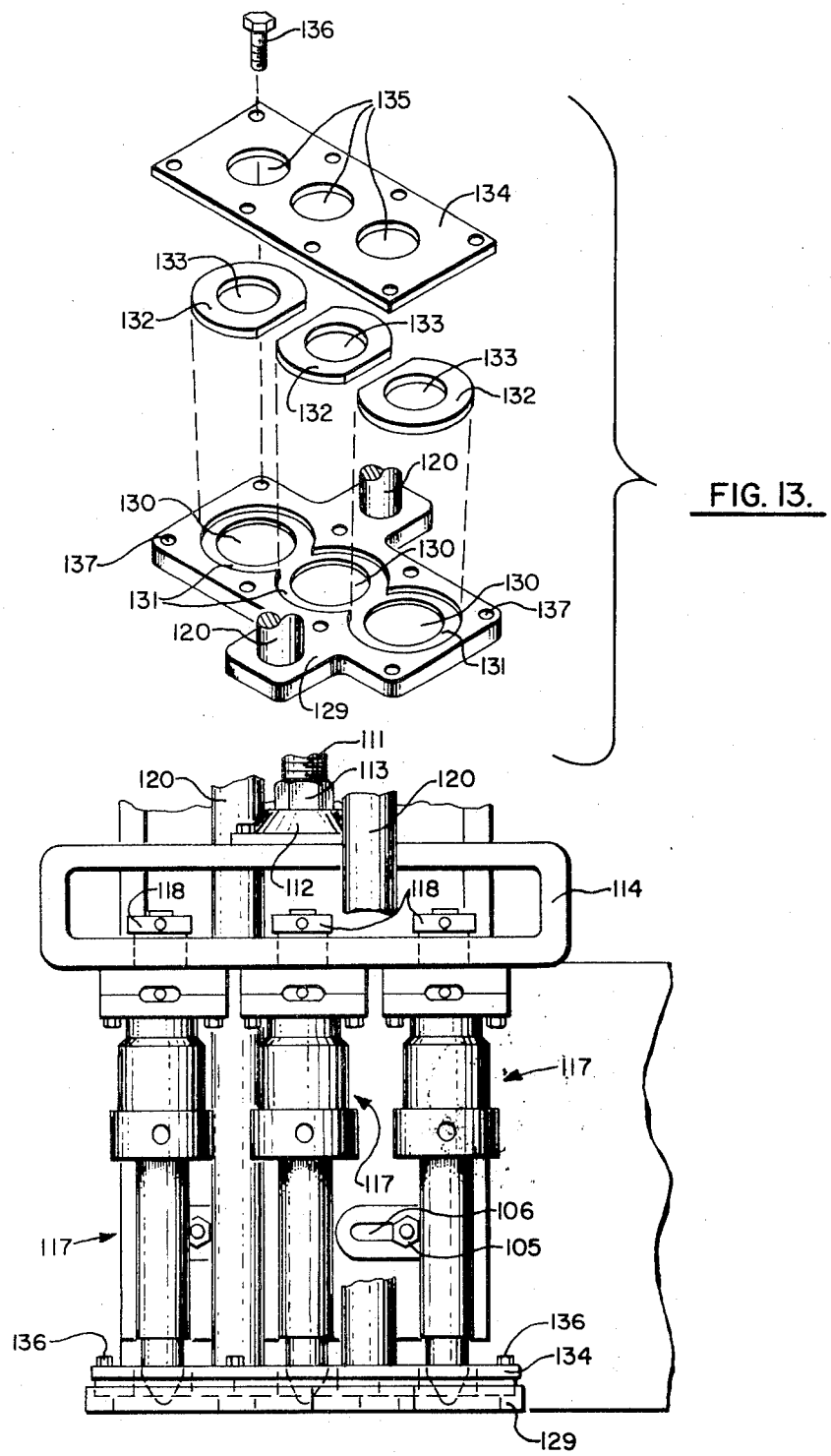

BLOW MOLDING APPARATUS

This is a continuation of application Ser. No. 232,666, filed Mar. 8, 1972, now forfeited.

BACKGROUND OF THE INVENTION

1. Field of the Invention

This invention relates to a method and apparatus for blow molding hollow plastic containers.

2. Description of the Prior Art

Early models of thermoplastic blow molding machines for producing hollow plastic containers utilized a fixed plastic extruder which extruded a parison downwardly between two open mold halves adapted to be closed around the parison. These mold halves were carried by movable platens, usually actuated with hydraulic or mechanical toggle devices with one-half of the mold being positioned on each side of the extruder. While many of these types of blow molding machines are still in use today, they suffer many disadvantages which have been overcome by some of the more modern machines on the market. Generally, the older machines require either that the plastic feed screw be stopped or that a valve be closed to interrupt the flow of the plastic material to enable the parison to be cut and blown by the mold which was fixedly positioned directly beneath the extruder outlet. While this is not particularly detrimental when extruding non-heat-sensitive polymers, such as medium, low and high density polyethylene, it is a decided disadvantage when extruding heat-sensitive polymers, such as polyvinyl chloride. It is highly desirable to continuously move the heat-plastified polyvinyl chloride through the extruder and into the blow molding apparatus in a continuous manner to avoid heat degradation.

In recent years, blow molding machines have become available which permit the continuous extrusion of the plastic parison and subsequent formation of hollow plastic containers therefrom by machines which utilize two different principles. In some of the older machines, the parison was continuously extruded, and trapped segments thereof were received between traveling mold halves which were brought together by cams or tracks or by hydraulic means as they gripped the parison. These mold halves were carried on separate wheels which were adapted to rotate either in the horizontal or in the vertical plane. Machines designed on this principle found some commercial utility; however, the maintenance costs and the inability to maintain the close precision fit required for the operating components have lead to a rapid decline in the use of this type of blow molding apparatus. Additionally, when larger containers became popular, the operating difficulties of the rotary machines were magnified.

The more recent high speed machines adapted to continuously extrude a plastic parison and to continuously carry out blow molding, cooling and ejection steps have found wide commercial use in all parts of the world. These machines utilize the basic principle taught in U.S. Pat. No. Re. 25,290 wherein the mold halves are reciprocated underneath the fixed extruder head to receive the parison and then reciprocated back again over the same path to a blow station where the parison trapped between the mold halves is blown to the contour of the mold, cooled and ejected therefrom. The commercial versions of machines operating according to the principle of the above-noted Parfrey patent utilize blow molds carried on platens which are supported on mold transport assemblies adapted to move the mold halves underneath the extruder head. Dual-station, reciprocating, blow molding machines commercially available utilize extremely complex construction. The mold transport mechanisms, the extruder frame and accessory parts are usually built into one large, integrated unit. The mold transport assemblies and the mold closing power means are usually actuated by hydraulics. One of the prime disadvantages of commercially available, dual-station, reciprocating, blow molding machines is the fact that the user cannot repair one component or one element of the machine without shutting down the machine operation completely. If a malfunction occurs in one of the blow molding stations, i.e., the mold transport assembly or the blow pin assembly, it is generally necessary to close the complete machine down in order to service one-half of the blow molding parts of the machine. Additionally, when the mold setup is being made on the machine, the complete machine is down and out of service for the full length of time it takes to remove the old mold halves, replace with the new mold halves and to make a test run using the new mold halves.

One of the more commonly used, reciprocating, dual-station, blow molding machines is that described in the magazine Plastics, April, 1965 (published in Great Britain). This machine incorporates two molding stations which are operated alternately so that dual production is achieved from a single extruder and parison head. Each set of mold halves moves on a diagonal path and is powered by hydraulic cylinders. Another two-station, alternately operated, blow molding apparatus similar to the above described machine moves each set of mold halves in an arcuate path from the blow mold station to the parison extrusion station and back again.

From the foregoing, it is seen that the blow molding industry is in need of a dual-station, blow molding machine wherein each of the stations utilizes an integral, self-contained, blow molding subassembly. The subassemblies are mounted on a base which is capable of being removed from the outer portions of the blow molding machine for mold setup and maintenance. This provides the industry with a blow molding machine which has the capability of being set up in a location different from the location of the extruder and platform components.

SUMMARY OF THE INVENTION

It is an object of the present invention to provide a method and apparatus for blow molding containers with a dual-station, blow molding machine.

It is another object of the present invention to provide a method and apparatus for blow molding containers wherein the blow molding subassemblies and their base can be separated from the remainder of the machine.

It is still another object of the present invention to provide a method and apparatus for blow molding containers which utilize pneumatic power means.

It is also an object of the present invention to provide an apparatus for blow molding plastic containers which provides positive, low maintenance power means for closing the blow mold halves.

It is still another object of the present invention to provide a method and apparatus for blow molding plastic containers which utilize a novel mechanism for opening and closing the blow molds.

The foregoing objects and other advantages that are brought out hereinafter are realized in the apparatus aspects of the present invention in an apparatus for blow molding plastic containers which includes means for supplying a tubular parison of moldable plastic material at a parison supply station. A first means is provided for transversely moving a first pair of blow mold halves to the parison supply station to receive the parison and to return the parison to a blow station. A second means is provided for transversely moving a second pair of blow mold halves to the parison supply station to receive a parison and to return the parison to a second blow station. Means are carried by the first and second means for transversely moving the first and second pair of blow mold halves for opening and closing the blow mold halves. A first, fixedly mounted blow pin assembly is positioned to engage the first pair of blow mold halves at a first blow station to expand the enclosed parison. A second, fixedly mounted blow pin assembly is positioned to engage a second pair of blow mold halves at a second blow station to expand the enclosed parison.

The process aspects of the present invention are realized in a process for blow molding plastic containers which includes supplying a first, thermoplastic parison from a fixed extrusion station. A first, split blow mold, which is located at one side of the extrusion station is moved to the extrusion station in a path which is substantially perpendicular to the axis of the first parison. The path of the blow mold is changed to an upwardly inclined path over the last few inches of travel as the blow mold reaches the extrusion station. The parison is enclosed in the first blow mold, and it is returned over the same path on which it approached the extrusion station. The parison is then blown to form the container at the blow station. A second blow station and a second blow mold may be located on opposite sides of the extrusion station to carry out the above described process alternating with the first blow mold.

One of the prime advantages of the apparatus of the present invention is that the major part of the blow mold apparatus is completely transportable and readily movable from one location to another, for example, by use of a forklift truck. This mobility permits the blow mold apparatus of the present invention to be utilized with a permanently located extruder which is completely separate and does not have to be connected to the blow mold apparatus. Another of the significant advantages of the blow mold apparatus of the present invention is the utilization of pneumatic power for actuating the mold transport subassemblies, the mold closing mechanism for the mold halves, and the blow pin assembly. The advantages of pneumatic power over hydraulic or oil power are well known, e.g., comparatively low operating pressures, fluid leak-resistant lines, cleaner operation due to absence of oil leaks, less contamination of product from oil spills and drips, and lower operating costs because of utilization of air pressure from a central source rather than requiring independent hydraulic drives for each extruder and blow mold setup. The blow mold apparatus of the present invention also has a distinct advantage in the utilization of a cam and cam follower mechanism for driving the platens which carry the blow mold halves. Heretofore, direct drive, hydraulically actuated cylinders have been used to close the platens and, thus, the mold halves together around the parison. This requires heavy castings and high energy power sources to operate through X- or toggle linkages to achieve the required closing pressures for an efficient blow molding operation. The novel cam and follower mechanism used in the blow molding apparatus of the present invention is characterized by its simplicity, its freedom from maintenance and its high operational dependability. A further significant advantage of the apparatus of the present invention is found in the utilization of rotary, linear, pneumatically powered subassemblies for driving the cam and cam follower mechanism to open and close the mold halves and also to furnish power to the mold transport subassemblies for moving the molds into position under the extruder and retracting the molds to the blow station. These units are simple in construction, highly dependable and readily maintained.

Other advantages and novel features of the invention will be described hereinafter in connection with the description of the embodiments found in the drawings.

BRIEF DESCRIPTION OF THE DRAWINGS

FIG. 8 is an enlarged, partially sectional, partially elevational view of the blow pin assembly used in the blow mold apparatus of the present invention;

FIG. 9 is a right-hand-side, elevational view of the blow pin assembly of FIG. 8;

FIG. 12 is a front, elevational view of another embodiment of the present invention showing multiple blowing heads on the blow pin apparatus of the present invention;

FIG. 13 is an exploded, elevational, perspective view of the stripper assembly for the blow pin apparatus seen in FIG. 12;

DESCRIPTION OF THE PREFERRED EMBODIMENTS

Figure 1:
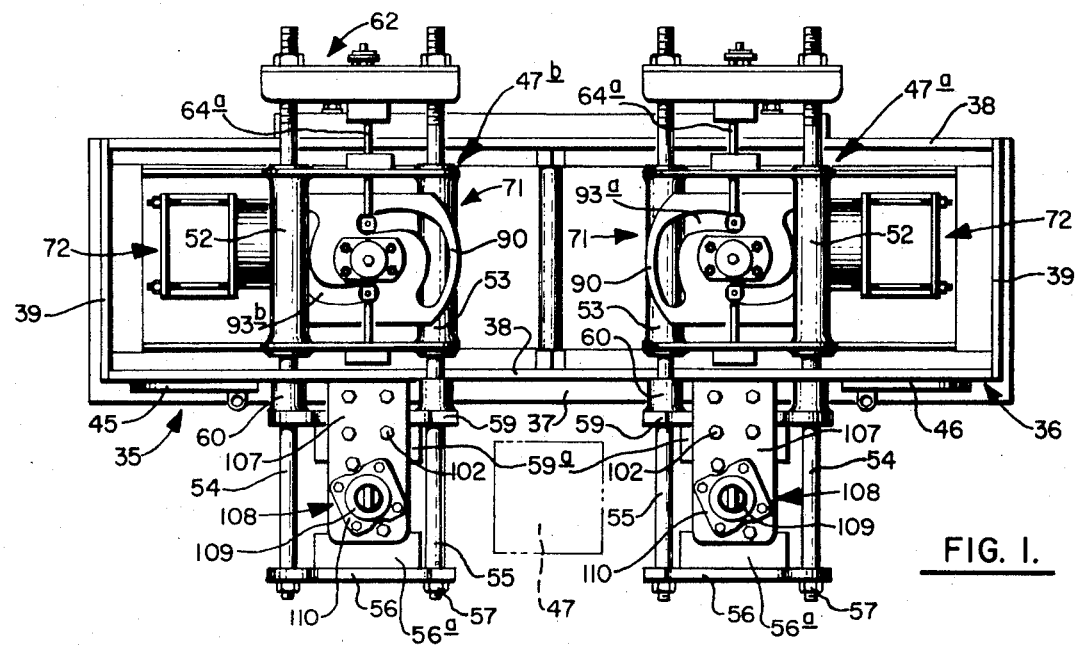
FIG. 1 is a top plan view of a dual-station blow molding apparatus constructed in accordance with the present invention.
Figure 2:
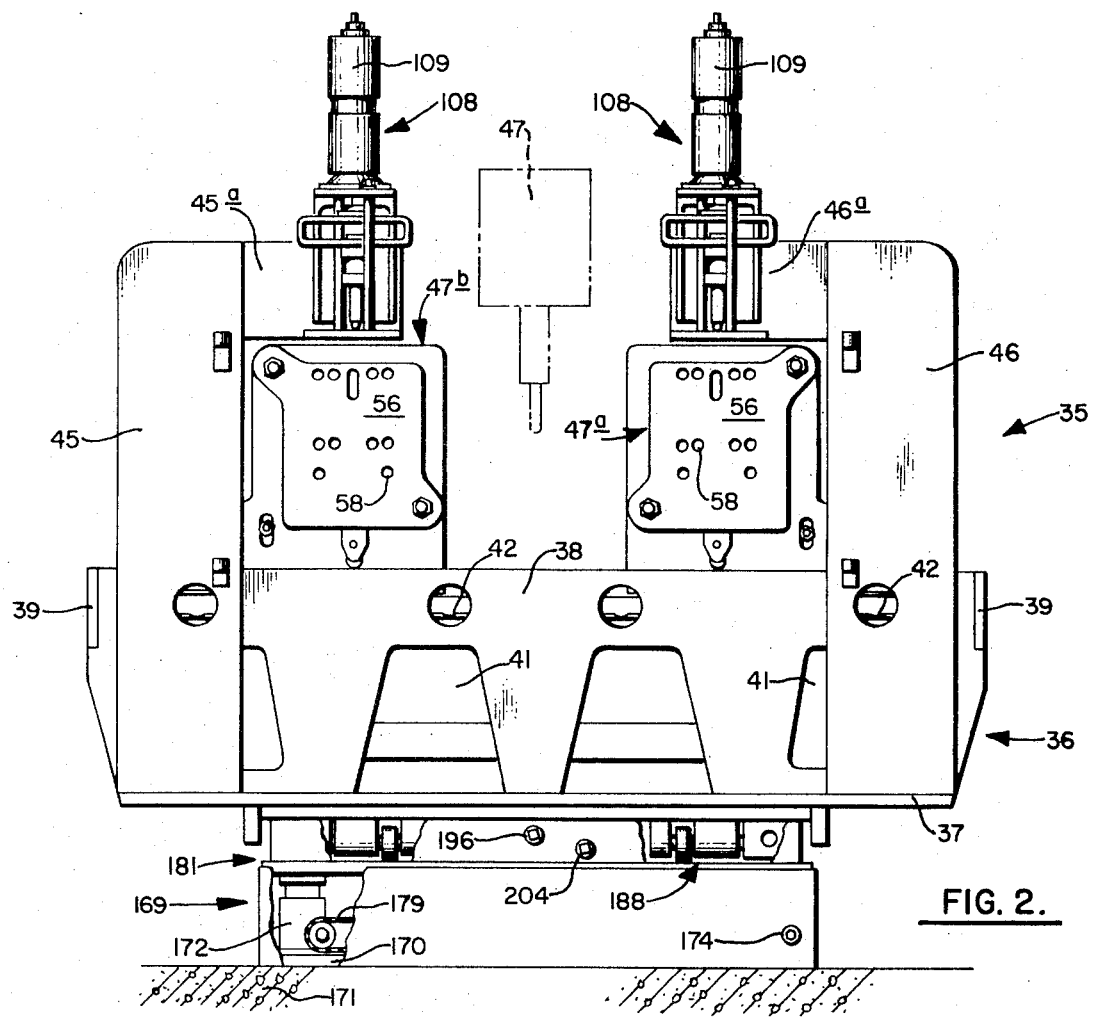
FIG. 2 is a front, elevational view of the blow mold apparatus of FIG. 1.
Figure 3:
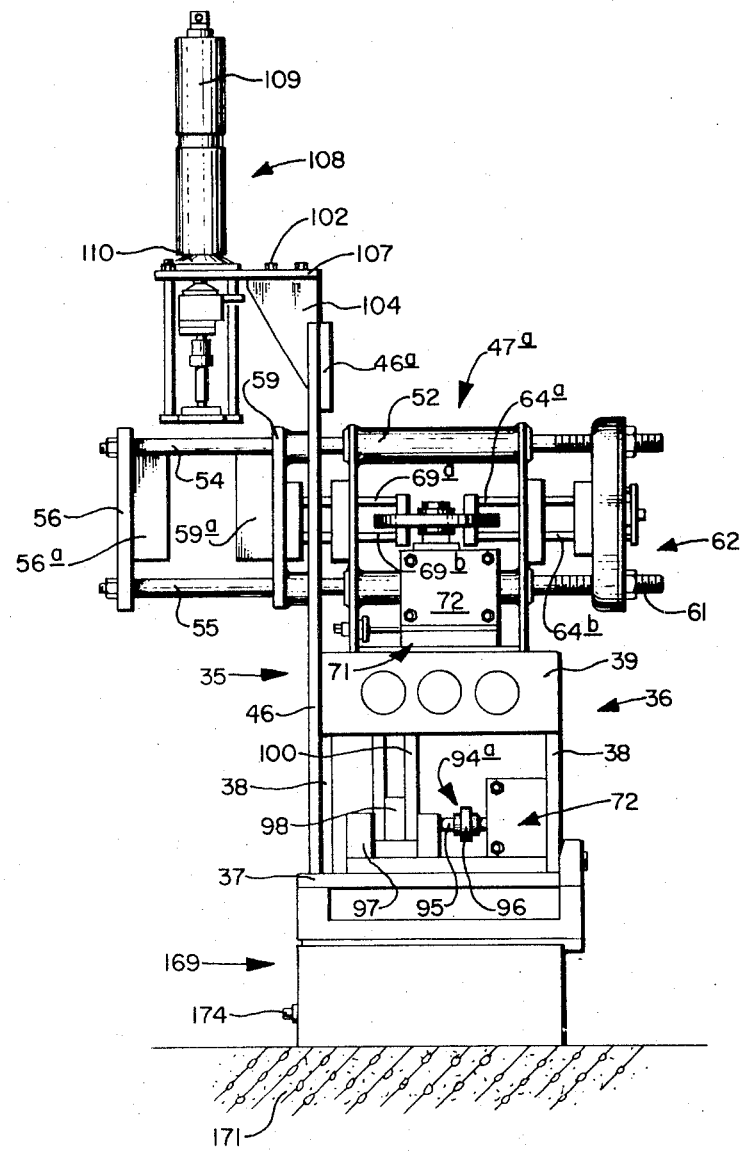
FIG. 3 is a right-hand-side, elevational view of the blow mold apparatus of FIG. 2.
Figure 15:
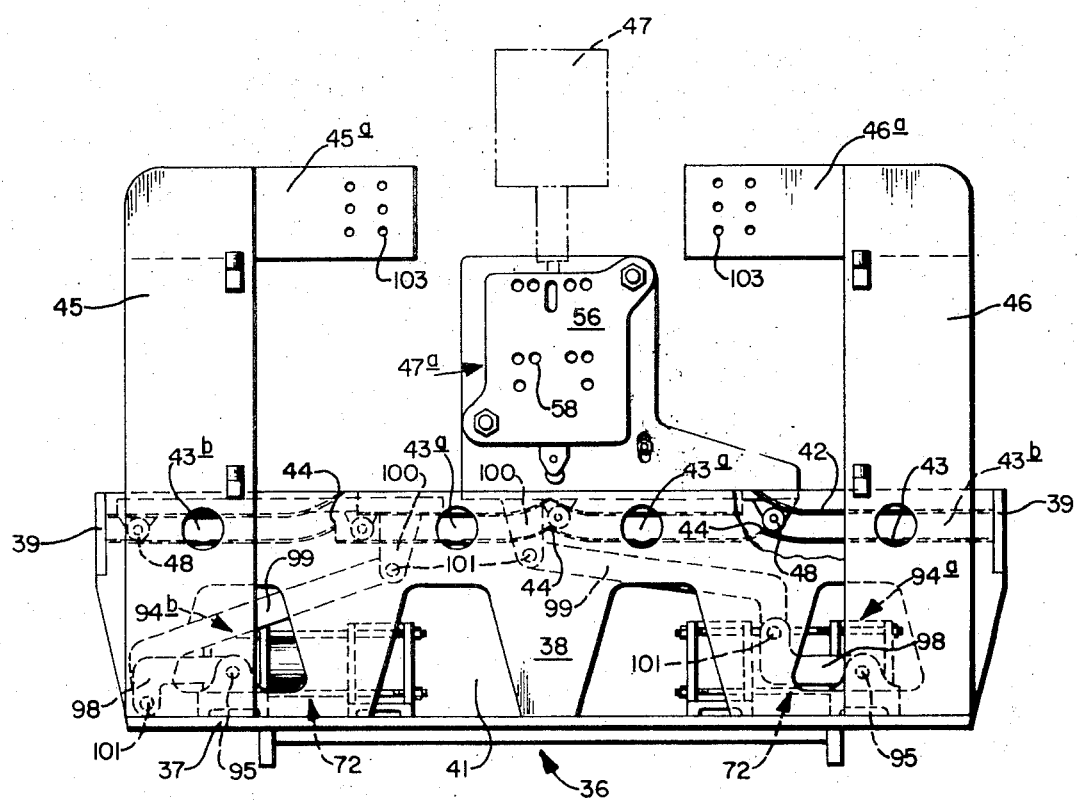
FIG. 15 is a front, elevational view of the base assembly for the blow mold apparatus of the present invention with the right-hand transport and actuating assembly mounted thereon.

Referring now to FIGS. 1, 2 and 3, the blow molding apparatus of the present invention is designated by the numeral 35. The apparatus includes a support frame designated generally by the numeral 36. The support frame includes a generally rectangular, heavy, metal base member 37. A pair of side frame members 38—38 are welded to the base member 37 at one edge and extend upwardly therefrom. The side frame members are provided with a number of openings 41 therein to permit access to the interior of the support frame. End frame members 39—39 are weldably attached to the ends of side members 38 to provide a rigid support frame structure. A left-hand, upwardly extending bracket member having a generally L shape and designated by the numeral 45 is attached by welding or other suitable means to the front side plate 38 and the base member 37 of the frame as seen in FIGS. 2 and 15. A like right-hand, L-shaped bracket 46 is attached to the right-hand side of the support frame in the same manner.

Figure 16:
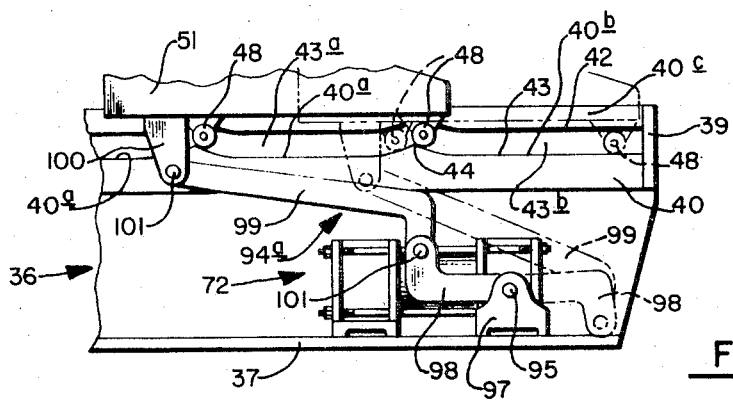
FIG. 16 is an enlarged, broken, elevational view of the base of the present invention showing the position of the linkage connecting the power means and the transport assembly.

As seen in FIGS. 6, 14, 15 and 16, the back side member 38 is provided with a lower support flat rail 40 and upper flat guide rail 40c attached thereto. The front side member 38 is provided with lower V rail 43 and an upper V guide rail 42 attached thereto. As seen in FIG. 15, the lower V rail 43 is divided into forward segments 43a—43a and rearward segments 43b—43b. Each of the rail segments 43a—43b of the left side member 38 terminates in an upwardly directed, arcuate end section designated 44. As seen in FIG. 16, lower flat rail 40 is likewise divided into forward flat rail sections 40a—40a and rearward flat rail sections 40b—40b. Each rail section 40a—40b on right side member 38 terminates in an upwardly directed, arcuate end section 44.

Figure 4:
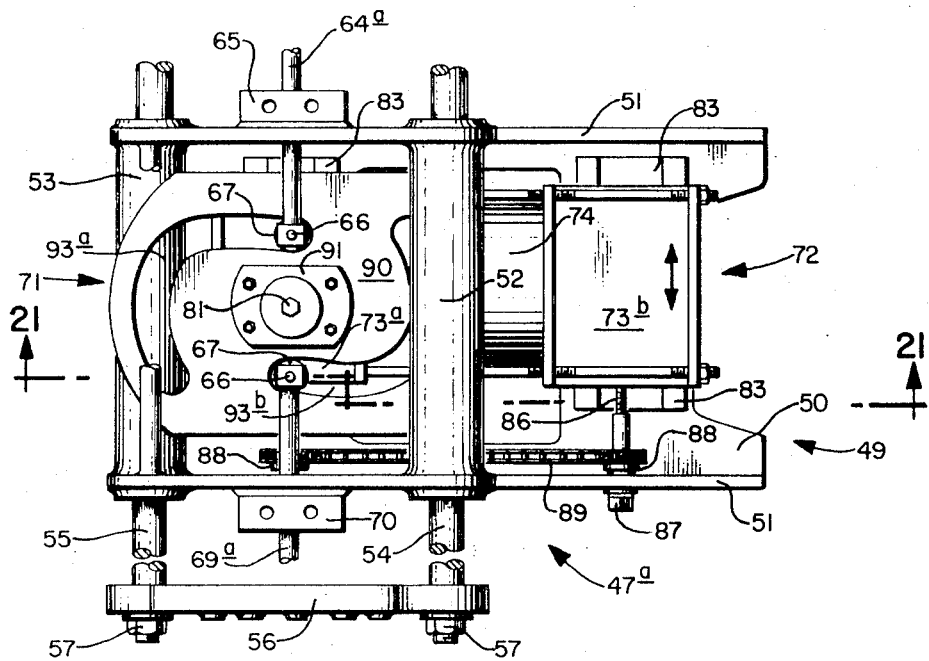
FIG. 4 is an enlarged, top plan view of the mold transport subassembly utilized in the present invention.
Figure 5:
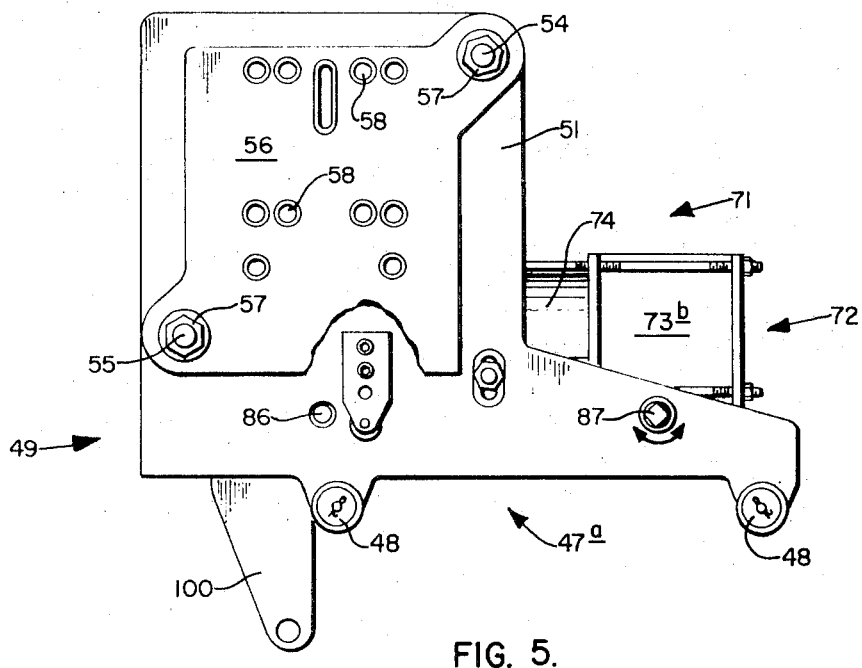
FIG. 5 is a front, elevational view of FIG. 4 showing the mold carrying platen.
Figure 6:
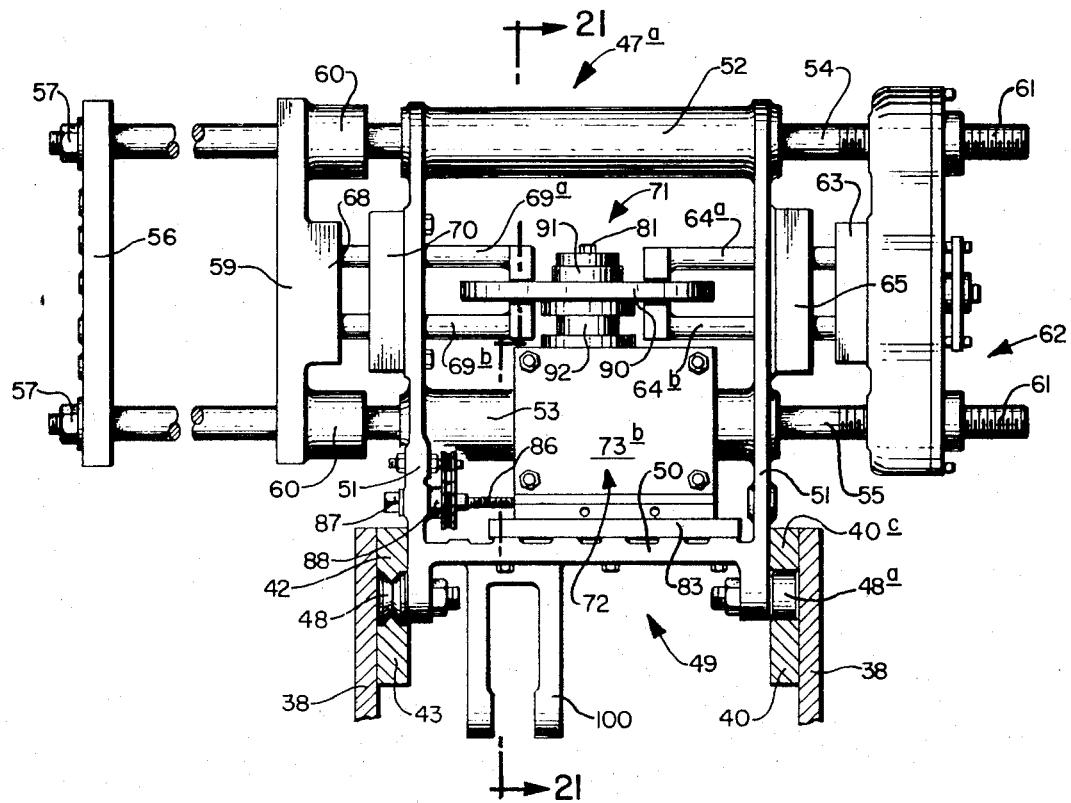
FIG. 6 is a right-hand-side, elevational view of the mold carrying subassembly of FIG. 4.

Referring now to FIGS. 1-5, the blow mold apparatus includes a right-hand blow mold transport and actuating assembly 47a and a left-hand blow mold transport and actuating assembly 47b. As seen in FIGS. 1, 2, 3 and 6, the right- and left-hand transport and actuating assemblies 47a and 47b are mounted on the rails carried by the support frame and are adapted to alternately move between the blow station, in which position they are depicted in FIGS. 1, 2 and 3, and the parison-receiving station immediately beneath the extruder 47. As seen in FIGS. 5 and 6, each of the transport and actuating assemblies includes two front V wheels 48—48 which are adapted to ride on the rail 43 of the support frame. Rear flat wheels 48a—48a ride on lower flat rail 40. As seen more clearly in FIG. 6, the left-hand V wheels 48—48 have a V-shaped bearing surface to insure that the transport mechanism does not move transversely when it is being transported back and forth across the carriage rails. The blow mold transport and actuating assemblies include a frame structure, designated generally 49. The frame structure includes a base plate 50, as seen more clearly in FIGS. 4 and 6, having attached to each side thereof side frame members 51—51. The frame structure 49 may be made from cast metal or it may be made from heavy metal stock by welding or other suitable means. An upper, centrally positioned bushing member 52 extends between the sidewall frame members 51—51 and is weldably attached, or attached by other suitable means, thereto. Lower bushing member 53 is likewise attached between the side frame members 51—51 at the forward end of the blow mold transport and actuating assembly. An upper tie bar 54 is slidably received in upper bushing 52 and projects from each end thereof. A lower tie bar 55 is slidably received in lower bushing 53 and extends from each end thereof. The forward ends of tie bars 54 and 55 are threaded and are received in openings provided in forward platen 56 which is attached to the tie bars by means of nuts 57. As seen in FIG. 5, a plurality of bolt holes 58 are provided in the forward platen 56 which receive bolts for holding the outer mold half 56a against the inner face of the platen. A rearward platen 59 is slidably mounted on tie bars 54 and 55 by means of integral, elongated bushings 60—60 as can be seen more clearly in FIG. 6. The rearward platen 59 has the same general shape as the forward platen 56 and is also provided with holes therein (not shown) for attaching inner mold half 59a thereto by means of bolts.

The rear portion of the tie bars 54 and 55 is provided with threads 61. A forward platen adjustment assembly, designated generally by the numeral 62, is mounted on the rear ends of tie bars 54 and 55 and is adapted to be moved over the threaded portions 61—61 thereof.

Figure 23:
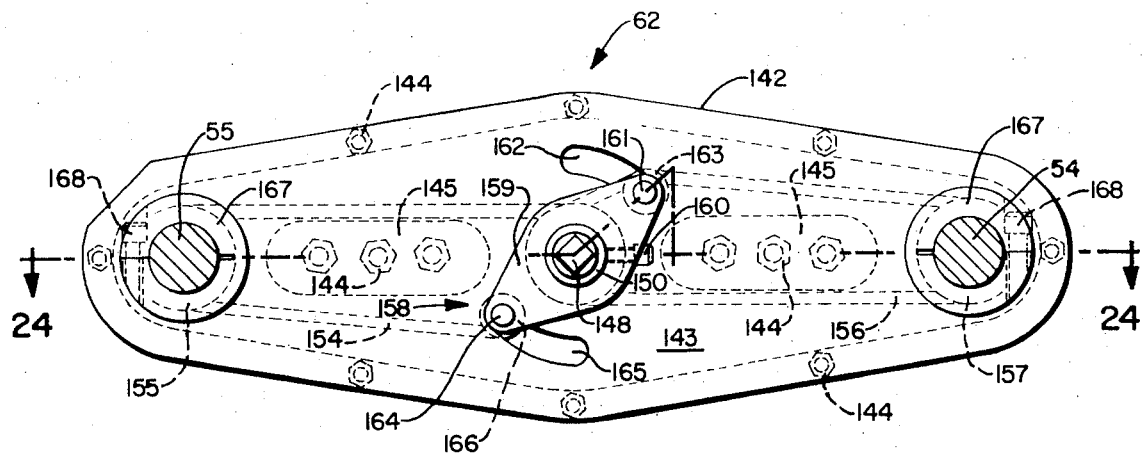
FIG. 23 is an enlarged, front, elevational view of the forward platen adjustment assembly.
Figure 24:
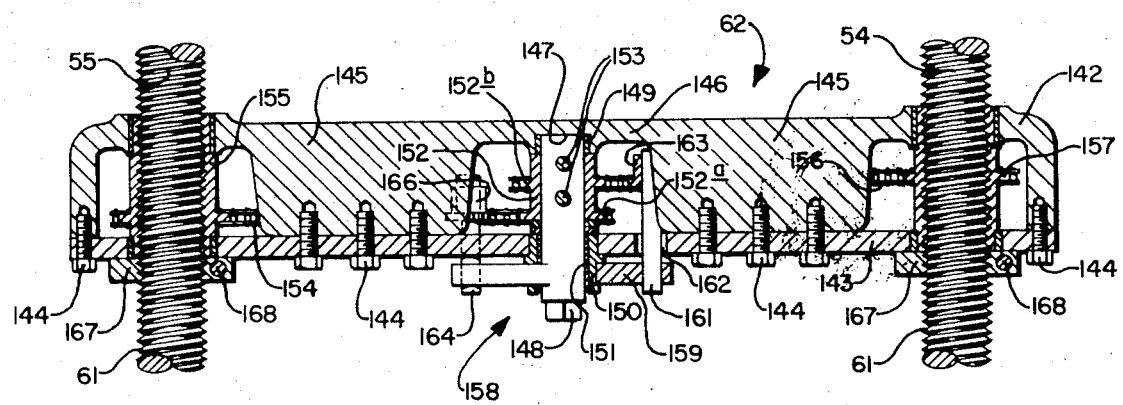
FIG. 24 is a cross-sectional view of FIG. 23 taken on line 24—24.

As will be seen more clearly in FIGS. 23 and 24, the forward platen adjustment assembly includes a generally eliptical cast housing section 142. The housing is closed by cover plate 143 which is attached to the housing by means of bolts 144 received in threaded openings provided in the walls of the housing. Additional strength is provided in the adjustment assembly by means of spaced apart, integrally formed bosses 145—145 which project forwardly in the housing and provide anchor means for the cover plate through additional bolts 144. The central portion of the back wall 146 of the housing is provided with an annular recess 147 which receives the end of cylindrical shaft 148 which is rotatably mounted in the recess by means of bushing 149. The forward end of shaft 148 is received in a hub 150 which is attached to cover plate 143 by welding or other suitable means. Bushing 151 is provided between the hub 150 and the shaft 148 for rotation of the shaft. Sprocket 152 is fixedly mounted on shaft 148 by means of pins 153. Sprocket 152 is provided with a forward set of teeth 152a and a spaced apart, rearward set of teeth 152b. Drive chain 154 connects the forward set of teeth 152a to a sprocket 155 which is threadably mounted on the threaded end 61 of lower tie bar 55. Inner and outer ends of the sprocket 155 are rotatably mounted in the back wall 146 and the cover plate 143, respectively, for rotation therein utilizing bushings.

Rearward sprocket teeth 152b are connected by drive chain 156 to sprocket 157 which is threadably received on the threaded end 61 of upper tie rod 54. The inner end of the sprocket is received in the rear wall 146 of the casting and provides for rotation through a bushing, and, likewise, the forward end is received in a bushing set in an opening in the cover plate 143 whereby the sprocket 157 may be rotated on the shaft 54.

A tension adjust assembly, designated generally by the numeral 158, is mounted on the outer end of the fixed bushing 151. Takeup assembly includes a generally elliptical shaped bracket 159 which is mounted on the outer end of bushing 151 and is fixedly attached thereto by means of locking screw 160. The right-hand end of bracket 159 is provided with an inwardly extending, cylindrical shaft 161 which passes through an arcuate slot 162 in the cover plate 143. The inner end of shaft 161 is provided with an idler sprocket 163 rotatably mounted thereon which engages drive chain 156 to provide the correct amount of tension for this chain. Left-hand end of bracket 159 is provided with an inwardly extending shaft 164 which passes through arcuate opening 165 provided in the cover plate. The inner end of shaft 164 is provided with idler sprocket 166 rotatably mounted thereon, which sprocket engages forward drive chain 154 to provide the correct tension for this chain. Tension adjustment on drive chains 154 and 156 may be made by loosening locking screw 160 and rotating bracket 159 in either the clockwise or counterclockwise direction to provide the proper tension on these chains and then tightening screw 160 to lock the brakcet to the collar or hub 150.

If desired, the threaded ends of the upper tie bar 54 and the lower tie bar 55 may be provided with locking collars 167 which are threadably received on the tie bars and may be clamped thereto by means of set screws 168 to prevent movement of the platen adjust assembly 62 after the assembly has been properly positioned.

In operation, the forward platen adjust assembly 62 is actuated by attaching a suitable wrench to the end of center shaft 148 and rotating the shaft either clockwise or counterclockwise to drive the sprockets 155 and 157 threadably connected to the tie bars 54 and 55 in the direction desired. By rotation of the sprockets 155 and 157, the upper and lower tie bars may be pulled in or pushed out to, in turn, move the forward platen 56 either closer to or farther away from the rearward platen 59. Thus, by adjusting the forward platen 56, the space between the platens can be changed to accommodate any size split blow mold.

The platen adjustment assembly 62 has an anchor block 63 attached to the rear side thereof. An upper push-pull rod 64a and a lower push-pull rod 64b have their outer ends received in the anchor block and extend outwardly therefrom. The upper and lower push-pull rods 64a and 64b pass through a bushing block 65 which is attached to the outside of right-hand sidewall 51. The inner ends of push-pull rods 64a and 64b are joined together by means of a pin 66, as seen in FIG. 4, on which is rotatably received a roller bearing assembly 67.

Referring now to FIG. 6 in particular, the rearward platen 59 has a rearwardly extending, integrally formed anchor block 68 thereon. The forward ends of a second pair of push-pull rods are received in the anchor block 68. Upper push-pull rod 69a and lower push-pull rod 69b are of similar construction and length as hereinbefore described push-pull rods 64a and 64b. Push-pull rods 69a and 69b extend through left-hand sidewall 51 and are slidably received in a left-hand bushing block 70 mounted on the sidewall. The inner ends of push-pull rods 69a and 69b are joined by pin 66, as seen in FIG. 4, which carries a roller bearing 67 thereon in the same manner as the opposite push-pull rods 64a and 64b described above.

Figure 7:
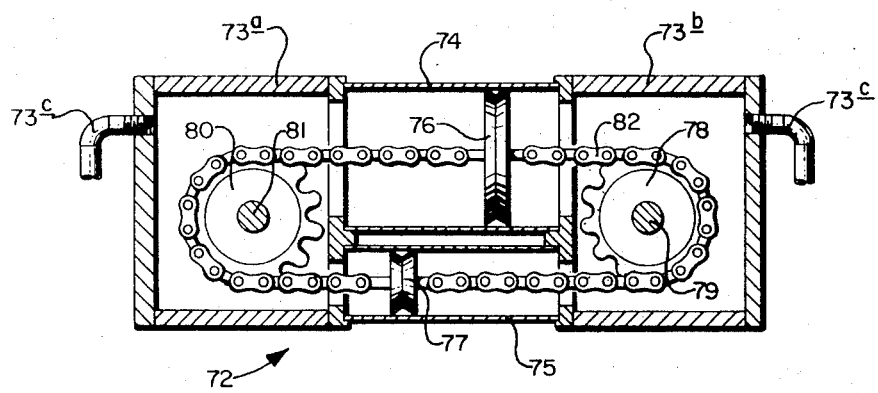
FIG. 7 is a longitudinal, sectional, elevational view of the pneumatic power subassembly used in the blow mold apparatus of the present invention.

Referring now to FIGS. 1, 3 and 4–6, the blow mold transport assembly includes a fluid power assembly, designated generally by the numeral 71, which is mounted on the base plate 50 of the frame. The power assembly operates to move the platens 56 and 59 together and away from each other to close and open the mold halves carried on each of the platens. The power assembly includes a double-acting, pneumatic power cylinder subassembly, designated generally by the numeral 72. As seen more particularly in FIG. 7, the double-acting power cylinder 72 includes a generally rectangular left end housing 73a and a right-hand rectangular end housing 73b. End housings 73a and 73b have received therebetween in an airtight seating relationship a central section which includes a master power cylinder section 74. Mounted below the master power cylinder 74 is a pilot cylinder 75. Piston 76 is slidably received inside master cylinder 74. A small pilot piston 77 is likewise received in pilot cylinder 75. A right-hand sprocket gear 78 is contained in right end housing 73b and is rotatably mounted thereon by means of shaft 79 to which the sprocket gear is keyed. A left-hand sprocket gear 80 is mounted in left end housing 73a and is carried on shaft 81 which rotates in bearing blocks (not shown) attached to the walls of the housing 73a. A drive chain 82 is carried by the right-hand sprocket gear 78 and the left-hand sprocket gear 80 and is coupled to the master piston 76 and to the pilot piston 77. The ends of master cylinder 74 and pilot cylinder 75 are open and communicate with the end housing 73a and 73b to permit the chain 82 to move freely therebetween. Compressed fluid for operating the pneumatic, double-acting power assembly 72 is supplied through hoses or conduits 73c—73c provided at each end housing 73a and 73b. By alternately admitting compressed fluid such as air or compressed nitrogen or other gaseous fluids to the respective end housing chambers 73a and 73b, the master piston 76 is caused to reciprocate back and forth within the cylinder 72 producing rotation of drive shaft 81. The degree of rotation of drive shaft 81 is controlled by the length of the cylinder 74 and, thus, the travel permitted for the power piston 76. In the pneumatic power cylinder 72 of the present machine, the stroke is limited to that necessary to drive the shaft through an arc of about 115 degrees. A suitable commercially available pneumatic power cylinder is manufactured by Graham Engineering Company.

Figure 25:
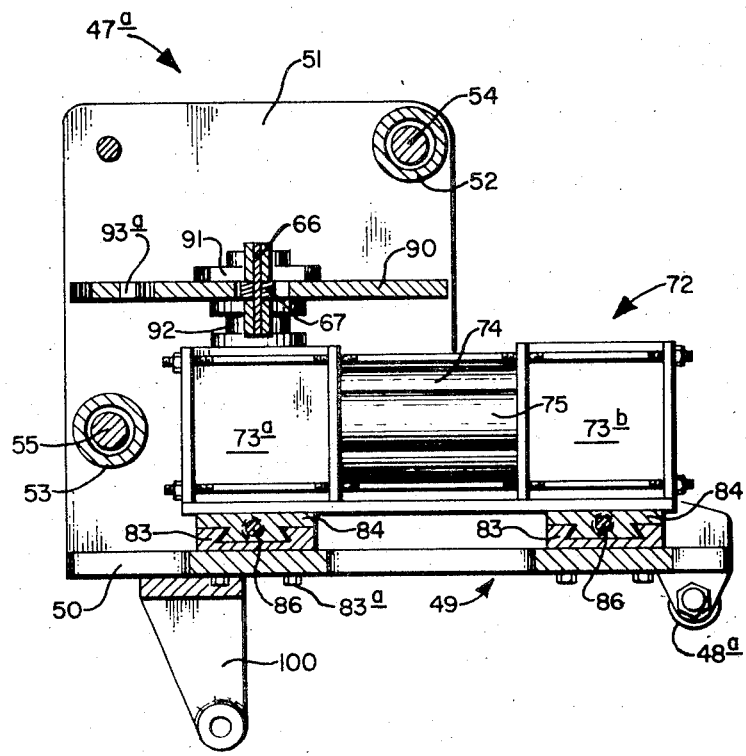
FIG. 25 is a cross-sectional view of the mold transport subassembly of FIGS. 4 and 6 taken along line 25—25.
Figure 17:
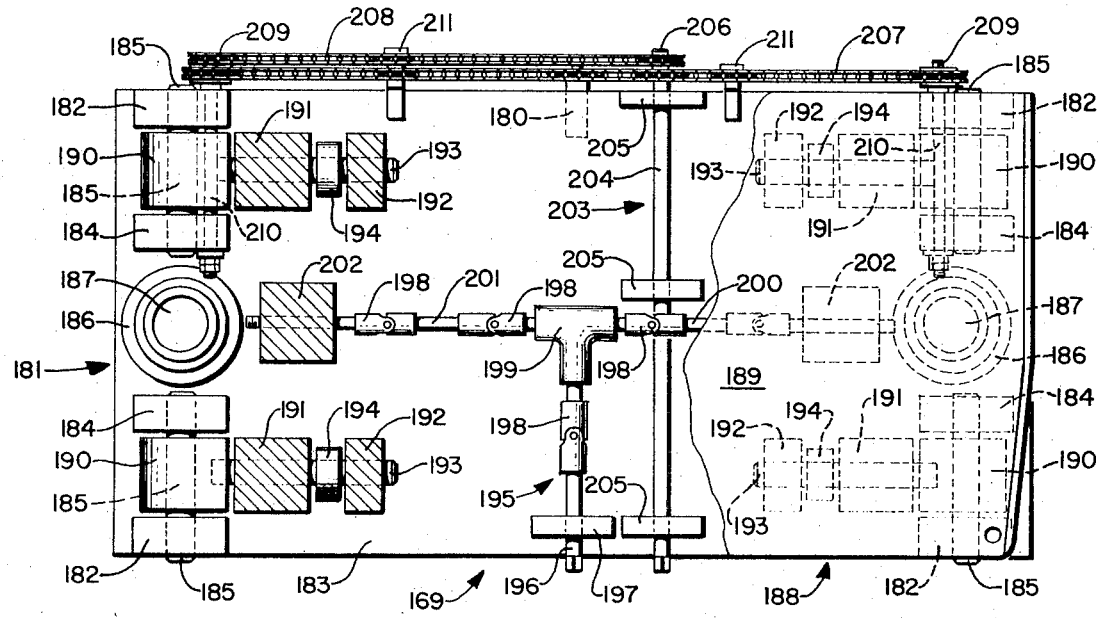
FIG. 17 is a top plan view, partially broken, showing one embodiment of the pedestal assembly for mounting the blow molding apparatus of the present invention.

Referring now to FIGS. 4, 6 and 25, the power cylinder assembly 72 is mounted on the bottom plate 50 of the frame 49 by means of a keyway plate 83 at each end of the frame underneath the housing ends 73a and 73b of the power cylinder assembly. The keyway block 83 is attached to the frame by mean of bolts 83a. The keyway block 83 slidably receives a keyway slide 84 which is, in turn, attached to the bottom of the end housing 73a and 73b of the power cylinder assembly. The keyway slides 84—84 each have an axially directed, threaded bore therein. A threaded rod 86 has one end received in the threaded bore in each of the keyway slides 84—84. The right-hand threaded rod 86 has its outer end rotatably journeled in a bearing provided in left-hand sidewall 51. The outer end of rod 86 terminates on the outside of left-hand wall 51 in the form of a rectangular drive nut 87. The left-hand threaded rod 86 is also journeled in a bearing in the left-hand sidewall 51, but does not have a drive nut on the end thereof. A drive sprocket 88 is keyed on each of the threaded rods 86—86. The sprockets 88—88 are connected by means of a drive chain 89 whereby they may be rotated together to position the power cylinder assembly.

By rotating the right-hand drive rod 86 by means of drive nut 87, the drive rod 86 is screwed in or out of the keyway slide 84 moving this slide transversely in the keyway block 83 and, thus, moving the rear end of the power cylinder 72 between the sidewalls 51—51 of the frame. As right-hand rod 86 rotates, it also drives left-hand rod 86 through the two sprockets 88—88 and the drive chain 89 to position the forward end of the power assembly 73a in exactly the same position as the rear end of the assembly. Thus, the mechanism provides a means for transversely shifting the pneumatic, double-acting power cylinder between the sidewalls of the frame which, in turn, shifts the center line position of the mold platens 56-59 and the mold halves 56a-59a toward or away from the blow mold and transport actuating assembly 47a. This permits exact alignment of the blow mold center line with the extruder 47.

Attached to drive shaft 81 of the pneumatic, double-acting power cylinder 72 is a mold closing cam 90. Cam 90 is attached to the drive shaft 81 by means of a flange 91. The lower position of shaft 81 extends through a bushing 92 mounted on the top of the forward end 73b of the pneumatic, double-acting power cylinder 72. Cam 90 is provided with two opposed, generally J-shaped cam openings 93a and 93b as may be seen more clearly in FIG. 4. Left cam opening 93a receives the roller bearing 67 carried by upper and lower push-pull rods 64a and 64b. The right-hand cam opening 93b receives a roller bearing 67 which is carried by the upper and lower push-pull rods 69a and 69b.

Referring now to FIGS. 6, 14, 15 and 16, the right-hand mold transport and actuating assembly 47a is moved over the support frame 36 by means of a right-hand transport or power assembly, designated generally by the numeral 94a. The left-hand blow mold transport and actuating assembly 47b is likewise transported on the frame 36 by means of a left-hand transport power assembly, designated generally by the numeral 94b. These units are identical in construction and in operation.

Each of the transport or power assemblies 94a and 94b include a pneumatic, double-acting power cylinder 72 of exactly the same construction and operation as described hereinbefore in connection with the blow mold transport and actuating assembly 47a. The drive shaft on each of the power units 72—72 is coupled to the power shaft 95 of the power assembly by means of a detachable coupling 96 as seen more clearly in FIG. 14. Drive shaft 95 is carried by a pair of spaced apart bearing blocks 97—97 which are attached to bottom plate 37 of the frame 36. The shaft rotates in these bearing blocks over an arc of approximately 190 degrees. The shaft has keyed to it between device 97—97 a drive arm 98 which is reciprocated by the shaft 95. Pivotably connected to the end of drive arm 98 is pivot arm 99. Pivot arm 99 is pivotably coupled to the bracket 100 which is attached to and extends below the bottom of the base plate 50 of the frame 49 and, thus, propels the blow mold transport and actuating assembly 47a back and forth over rails 40 and 43. Pins 101—101 at each end of the pivot arm are used to attach the pivot arm 99 to drive arm 98 and to bracket 100.

Figure 10:
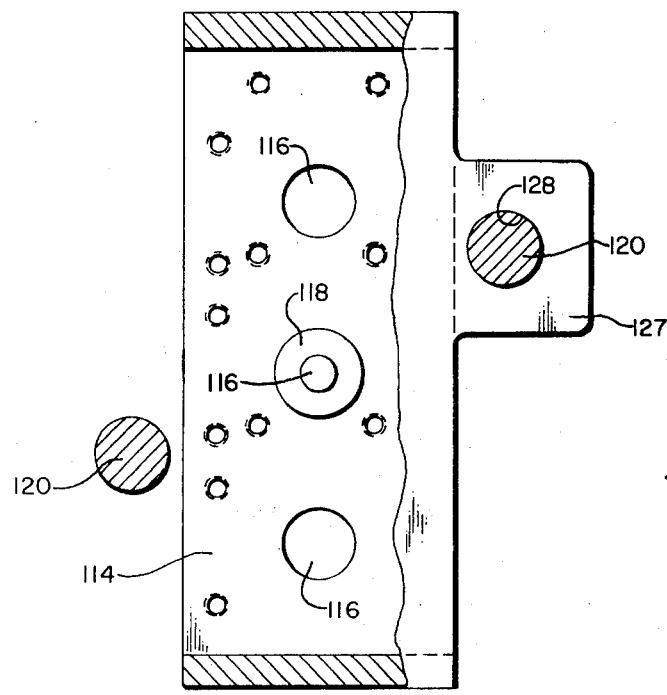
FIG. 10 is a partially broken, sectional view of the apparatus of FIG. 9 taken along line 10—10.

As seen more clearly in FIGS. 1, 2, 3, 8, 9 and 15, each of the left- and right-hand L-shaped brackets 45 and 46 have extending therefrom a transverse arm 45a and 46a, respectively. The arms are provided with a plurality of vertically arranged holes 103 therethrough as may be seen more conveniently in FIG. 15. Brackets 104—104 are mounted on transverse arms 45a and 46a by means of bolts 105 which extend through the holes 103 of the bracket arms. As seen in FIG. 12, the bolts 105 are received in horizontal slots 106 provided in the back wall of the bracket 104. By this arrangement, the position of brackets 104—104 can be adjusted in the horizontal plane on the bracket arms 45a and 46a. Attached to the top of brackets 104—104 are support plates 107—107 which are attached to the brackets by means of bolts 102. Mounted on support plates 107—107 and extending above and below the plates are blow assemblies, designated generally by the numeral 108—108. Each blow assembly includes a double-acting, pneumatic power cylinder 109 which extends vertically above the support plate 107 and is mounted thereon by means of flange 110. As seen in FIG. 8, a piston rod having a threaded end 111 extends from the power cylinder 109 through the flange 110 and a hole provided in the support plate 107. Threaded end of piston rod 111 is threadably received in a flange 112 and is locked thereto by means of nut 113 received on the threaded end of the piston rod. A rectangular support frame 114 is attached to the flange 112 by means of bolts 115. As seen in FIGS. 8 and 10, the lower wall of the support frame 114 is provided with three large openings 116 spaced equally across the length of the frame. A blow pin assembly, designated generally 117, is attached to the frame 114 by means of knurled nut 118.

Figure 11:
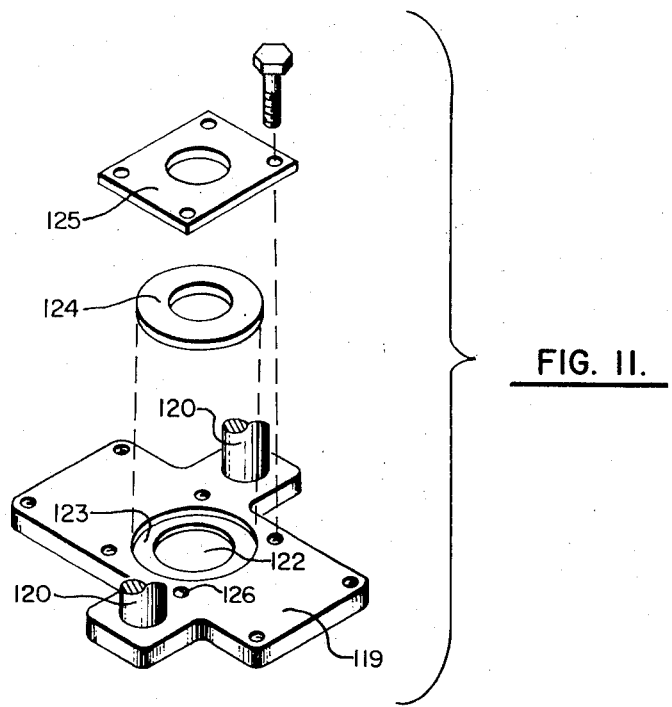
FIG. 11 is an exploded, elevational, perspective view of another embodiment of the stripper mechanism for the blow pin assembly of the present invention.
Figure 14:
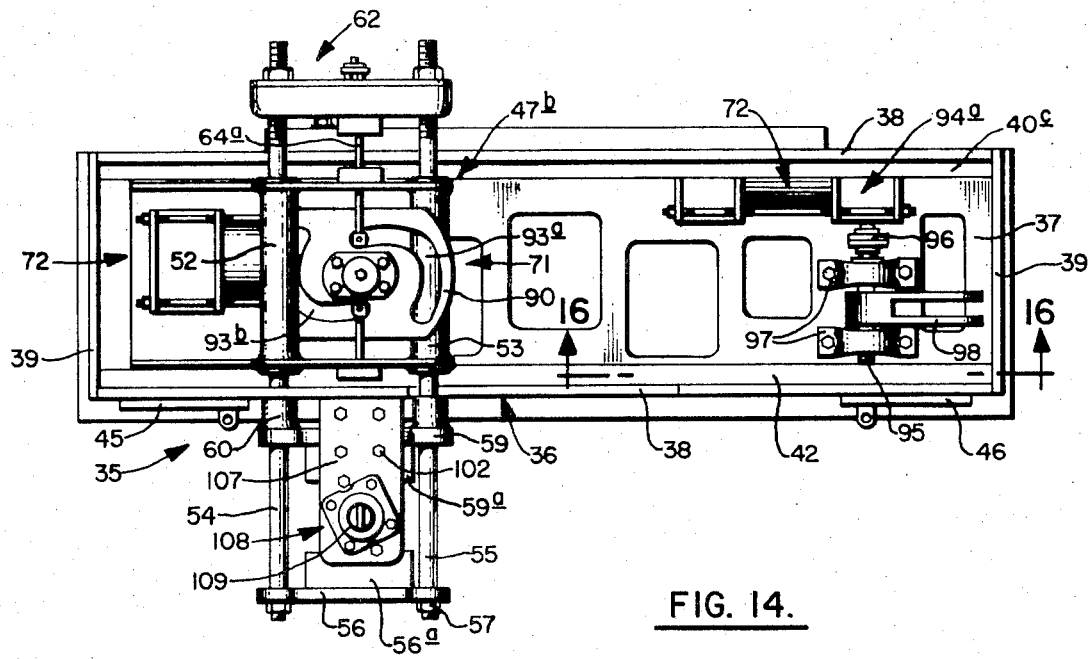
FIG. 14 is a top plan view of the base assembly for the blow molding apparatus of the present invention with the left-hand transport and actuating assembly mounted thereon.

Referring now in particular to FIGS. 8, 9 and 11, a stripper plate 119 is mounted adjacent the end of blow pin assembly 117 by means of a pair of hanger rods 120—120 which have their upper ends received in support plate 107 and are held thereon by means of nuts 121. The upper surface of the stripper plate 119 provides a large central opening 122 therein. The surface of the stripper plate 119 surrounding the opening 122 is recessed at 123. Stripper ring or washer 124 is received in the recess 123 provided in the face of the stripper plate 119. Stripper ring 124 is held in the recess by means of a hold plate 125 abutting the top of the stripper ring 124 and held thereon by means of bolts received in openings 126 tapped in the surface of the stripper plate 119. The opening in the stripper ring is sized slightly larger than the diameter of the cylindrical barrel of the blow pin assembly 117 and is adapted to strip off the neck moil or waste portion of the plastic article blown in the machine as the blow pin is retracted through the opening in the stripper ring 124.

As seen in FIGS. 9 and 10, the support frame 114 is provided with a pair of ears 127—127 which have openings 128—128 of sufficient size to freely receive and permit passage of the frame 114 up and down the two tie rods 120—120. This maintains the orientation of the frame 114 and, thus, insures alignment of the blow pin assemblies 117 which are mounted thereon.

Referring now to FIGS. 12 and 13, a second embodiment of the lower portion of the blow assembly 108 is depictd. The assembly utilizes the same support frame 114 as the embodiment shown in FIGS. 8 and 9; however, three blow pin assemblies 117—117—117 are mounted on the frame 114 by means of knurled nuts 118—118—118. An alternate stripper plate 129 is provided which has three large openings 130—130—130 provided therein. The top of plate 129 in the area surrounding the openings 130 is provided with annular recesses 131—131—131. Into each recess is fitted a stripper ring or washer 132, each of which has an opening 133 slightly larger than the diameter of the cylinder portion of the blow pin assembly 117. A holder plate 134 is provided with openings 125 which are aligned with the openings 133 and 130 provided in the stripper washers and the stripper plate. The holder plate is retained on the top of the stripper washers 132 by means of bolts 136 received in threaded tapped openings 137 provided in the stripper plate 129. When this type of blow pin assembly arrangement is utilized, it is possible to utilize a blow mold having three mold cavities on the platens of the blow molding machine and to blow three separate containers on each side of the machine in one step.

Referring now to FIGS. 8 and 9, an electrical microswitch assembly 138 is attached to support plate 107 by bracket 139. The back of the bracket provides vertical slots 140 therein in which are received bolts 141. This mounting arrangement permits the vertical adjustment of the microswitch 138 to actuate at the proper height of retraction of the blow pin assembly 117.

Figure 18:
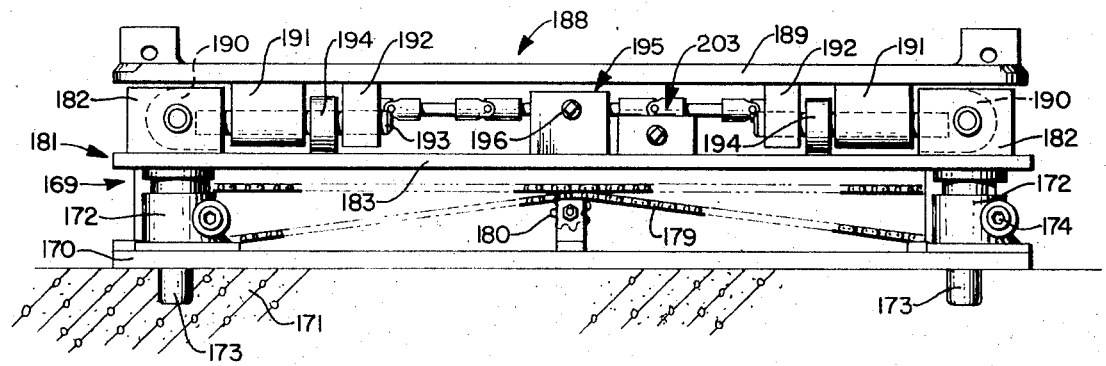
FIG. 18 is a front, elevational view of the pedestal assembly of FIG. 17.
Figure 19:
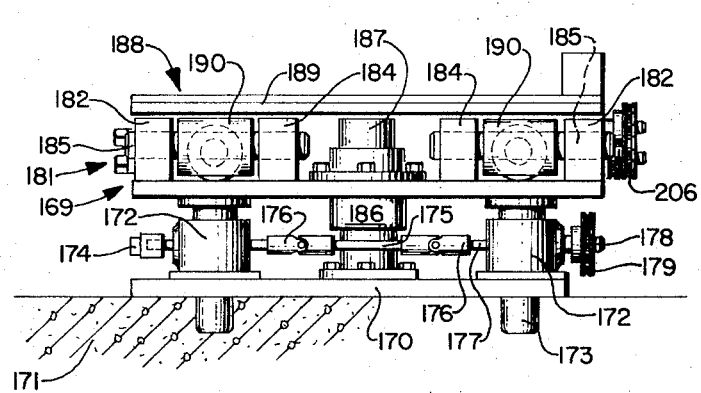
FIG. 19 is a right-hand-side, elevational view of the pedestal assembly of FIG. 18.

Referring now to FIGS. 2, 3 and 17-19, the blow molding apparatus of the present invention is mounted on a pedestal assembly, designated generally by the numeral 169. The pedestal or platform assembly provides means for adjusting the position of the extruder of the blow molding machine relative to the extruder head 47 whereby the blow molding apparatus may be adjusted in all three planes. The pedestal or platform assembly includes a lower table 170 which is in the form of a rectangular, heavy steel plate which rests upon the floor 171. Mounted at the four corners of the lower table assembly 170 are jacks 172 having shafts 173 which, in their lower position, are received in recesses provided in the floor. The jacks may be of any heavy-duty, commercially available type, for example, those driven by a worm gear assembly. The drive assembly for the lower assembly jacks includes a shaft 174 on the right-hand-corner jack, which shaft is provided with a hexagonal head for receiving a drive wrench. The shaft 174 is connected at its outer end, as can be seen in FIG. 19, to drive shaft 175 which includes two universal joints 176—176. Shaft 175 is coupled to shaft 177 of the right-hand rear jack which, in turn, has mounted on the outer end of shaft 177 a drive sprocket 178. Sprocket 178 carries drive chain 179. Drive chain 179 passes over idler-adjust sprocket 180. The left-hand set of jacks are coupled to the right-hand set of jacks through drive chain 179 and are driven through a shaft coupling assembly the same as described hereinbefore for the right-hand jacks.

A second or middle table subassembly, designated generally by the numeral 181, is fixedly attached to the upper end of the four shafts 173 extending from the jacks of the lower table subassembly. An outer mounting block 182 is fixedly attached, by welding or other means, to the upper surface of middle table 183 at each corner. An inner mounting block 184 is spaced opposite each outer block 182 and is fixedly attached by welding or other means to the top surface of middle table 183. A cylindrical support shaft 85 extends through openings provided in each set of mounting blocks 182-184. A cylindrical guide sleeve 186 is mounted between the inner mounting blocks 184—184 at each end of the middle table 183 and extends through an opening provided therein. Cylindrical guide shaft 187 is slidably received in the guide sleeve 186 and has its lower end attached to the upper surface of lower table assembly 170.

A third or top table subassembly, designated generally by the numeral 188, is mounted above the middle table and is movably coupled thereto. This assembly includes a top table 189 having generally the same shape as that of the middle and lower tables. A slide block 190 is positioned between each set of mounting blocks 182-184 provided on the middle table 183 of the pedestal assembly. Each slide block 190 is provided with a bore therethrough which receives the cylindrical support shaft 185 and is slidably positioned thereon. Support blocks 191 and 192 are mounted opposite slide block 190 and are attached to the underside of top table 189 by means of welding or other suitable means. Cylindrical support shaft 193 is received in openings provided in support blocks 191 and 192 and has its outer end received in slide block 190 and pinned thereto by means of a key (not shown) or other suitable means. A support wheel 194 is mounted on each shaft 193 between each set of support blocks 191-192. As seen in FIG. 18, the wheels 194 support the top table assembly 188 by riding on the supper surface of the middle table 183.

The position of the top table 189 is adjustable along the Z-axis of the pedestal assembly by means of a "Z"-axis adjust mechanism, designated generally by the numeral 195. The Z adjust mechanism includes an outer shaft 196 having its outer end extending through bracket 197 which is attached at its lower end to middle table 183. The shaft is provided with a universal joint 198 and has its inner end connected to a T gearbox 199, which gearbox drives shafts 200 and 201 extending outwardly from each side of the T. Each of the shafts 200 and 201 are provided with two universal joints 198—198 to provide flexibility in the shafts. The outer ends of the shafts 200 and 201 are threadably received in Z-blocks 202—202 which are weldably attached to the underside of top table 189.

The adjustment of the upper table 189 in the Y-axis is controlled by a Y-axis adjustment mechanism, designated generally 203. This mechanism includes a drive shaft 204 mounted on three spaced apart brackets 205—205—205 which have their lower ends weldably attached to middle plate 183. The rear end of shaft 204 is provided with a double-toothed sprocket 206 carrying right-hand drive chain 207 and left-hand drive chain 208. The outer end of each of the drive chains is received on a sprocket 209 which is keyed to a shaft 210 that is rotatably mounted in openings provided in outer mounting block 182 and inner mounting block 184. The central portion of shaft 210 is provided with threads (not shown) which are received in a threaded opening provided in the rear slide block 190. As described hereinbefore, slide block 190 is slidably mounted on support shaft 185. A pair of idler adjust pulleys 211—211 are mounted on brackets on middle table 183 and provide for adjustment of the tension on right-hand and left-hand chain drives 207 and 208. By rotating the outer end of shaft 204 with a wrench or other suitable tool, the shafts 210—210 can be rotated clockwise or counterclockwise, thereby providing for adjustment of the position of the top table 189 in the Y-axis by moving the table through connections with block 190, mounting blocks 191 and 192, keyed shaft 193 and wheel 194. The position of the top table is adjusted on the Z-axis by rotating the shaft 196 and the threaded outer ends of shafts 200 and 201 in mounting blocks 202—202, which are attached to the underside of the upper table, thereby displacing the table in the desired direction along the Z-axis. The weight of the entire blow molding apparatus is translated from the top table 189 to the four sets of spaced apart support blocks 191-192, which are slidably mounted on the shafts 193, to the wheels 194 which rest on top of middle table 183. Thus, the weight is passed from the top table through the aforementioned assemblies to the upper surface of the middle table 183.

The blow molding machine is adjusted in the X-axis by rotating the end of shaft 174 whereby the middle and upper tables are raised or lowered through the jacking mechanism described hereinbefore which is attached to the lower table. Thus, it can be seen from the foregoing that the blow molding apparatus of the present invention, through the use of the novel pedestal mounting assembly, can be adjusted in any of the three axes whereby the machine may be precisely positioned in order to receive the parison extruded from the fixed extruder precisely between the open halves of the molds carried on the platens of the blow molding machine.

Figure 20:
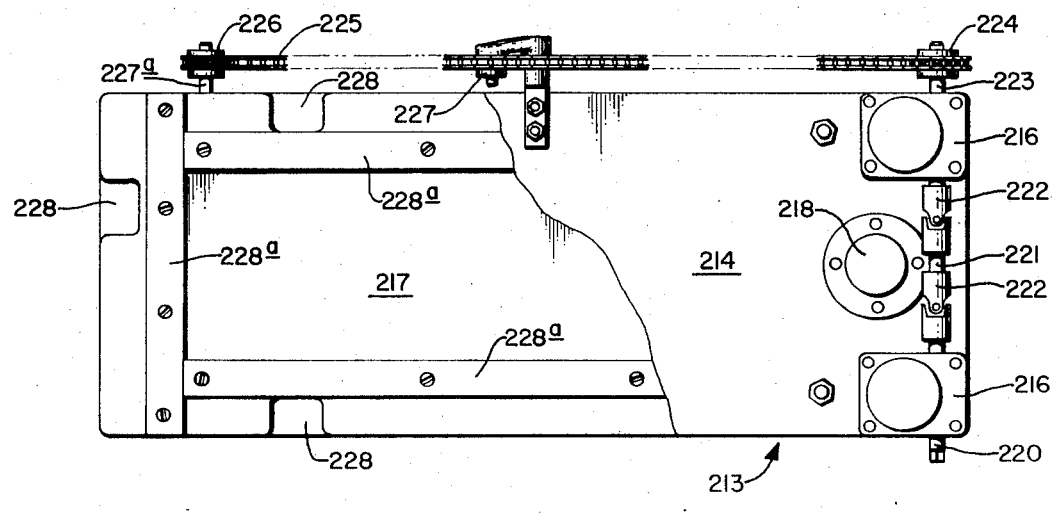
FIG. 20 is a top plan view, partially broken, showing another embodiment of the pedestal assembly for mounting the blow molding apparatus of the present invention.
Figure 21:
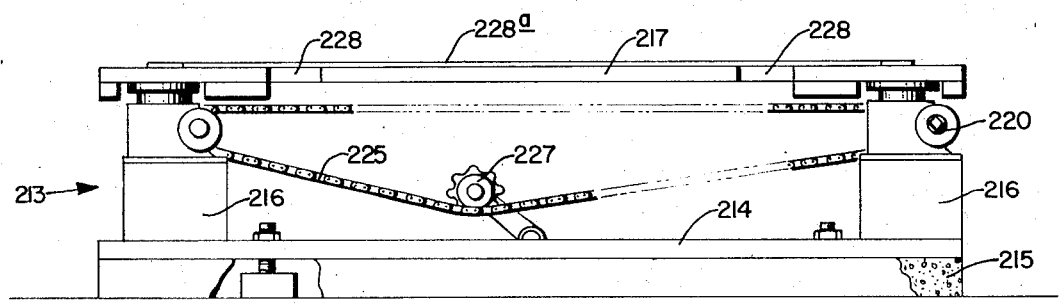
FIG. 21 is a front, elevational view of the pedestal assembly of FIG. 20.
Figure 22:
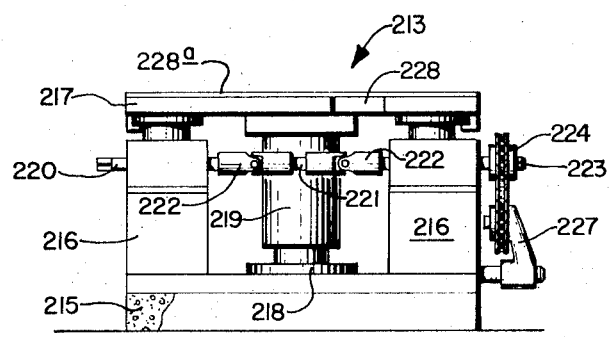
FIG. 22 is a right-hand-side, elevational view of the pedestal assembly of FIG. 20.

Referring now to FIGS. 20, 21 and 22, a second embodiment of the pedestal assembly, designated generally by the numeral 213, is depicted. In this embodiment, a first or lower plate 214 is mounted on a rectangular, concrete pad 215. The lower plate is provided with four jack assemblies 216, one at each corner thereof. The upper ends of the jack assemblies support a top or upper plate 217. A cylindrical guide pin 218 is provided between the jack assemblies 216—216 at each end of the lower plate and has its base attached thereto. The guide pin is slidably received in a downwardly extending, cylindrical sleeve 219 which has its upper end attached to the lower surface of top plate 217. Right-hand forward jack 216 is provided with a drive shaft 220 which extends through the jack assembly and is coupled to the right-hand rearward jack by means of shaft 221 which includes a pair of universal joints 222—222. Drive shaft 223 on the right-hand rear jack has a drive sprocket 224 connected to its outer end. Drive chain 225 passes over drive sprocket 224 and over drive sprocket 226, which is mounted on the outer end of shaft 227a of the left rear jack. Takeup idler sprocket 227 is attached to a bracket on the lower plate 214 and provides tension adjustment for the drive chain 225. Forward and rearward left jacks 216—216 are provided with drive assemblies similar to that described hereinbefore for the right-hand forward and rearward jacks. Top table 217 is provided with a series of rectangular recesses 228 along its edges on the front, back and each side. Fingers (not shown) projecting from the bottom of the frame of the blow molding machine are received in these recesses to provide slidable engagement of the blow molding machine with the slide surfaces 228a provided on the top of upper plate 217. The second embodiment for the pedestal assembly provides only for adjustment of the blow molding machine in the X-axis, i.e., up and down direction. Adjustment of the blow molding machine on the Y- and Z-axes, when using this embodiment of the pedestal assembly, is done by sliding the machine on the slides 228a on the top plate until the machine is in the desired position and then securely locking the blow molding machine to the top plate by means of bolts, etc. (not shown).

Figure 26:
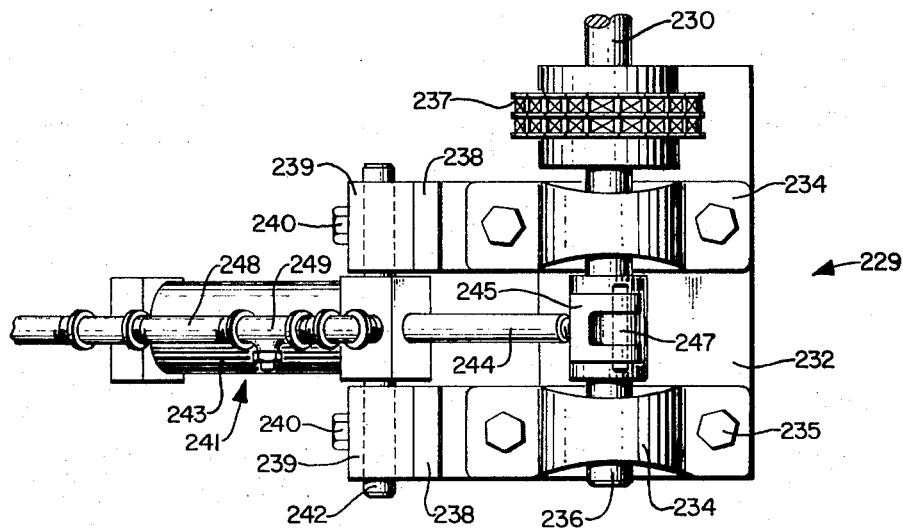
FIG. 26 is a top plan view of the travel cushion assembly.
Figure 27:
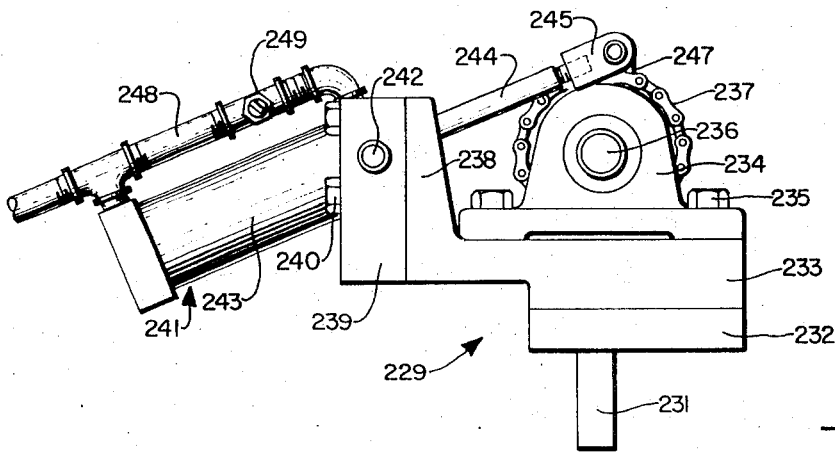
FIG. 27 is a left-hand-side, elevational view of the travel cushion assembly of FIG. 26.
Figure 28:
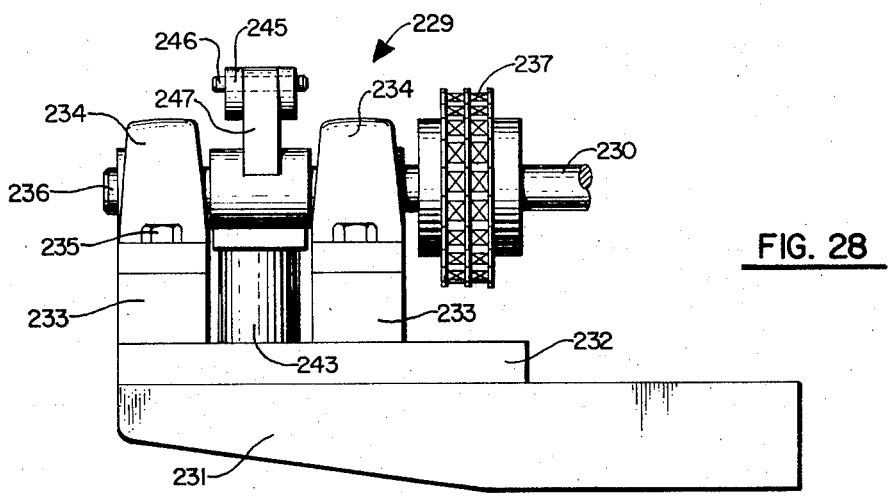
FIG. 28 is a rear, elevational view of the travel cushion assembly of FIG. 26.

Referring now to FIGS. 26, 27 and 28, there is depicted a travel cushion assembly, designated generally by the numeral 229, which may be attached to the right transport or power assembly 94a and to the left transport or power assembly 94b to cushion the travel of the respective right-hand transport and actuating assembly 47a and left-hand transport and actuating assembly 47b. A separate cushion assembly may be attached to both the right-hand transport or power assembly 94a and the left-hand transport or power assembly 94b by means of a shaft 230 which is attached to the shafts extending from the respective power assemblies. The travel cushion assembly is attached to the support frame base member 37 by means of a transversely extending bracket 231. Base plate 232 is attached to the outer end of the bracket 231 by means of welding or other suitable means. A pair of spaced apart bearing blocks 233—233 are attached by welding to the top of the base plate 232. A bearing assembly 234 is attached to each of the support blocks 233 by means of bolts 235. A cylindrical shaft 236 is rotatably received in the bearing blocks 234—234 and has attached to its inner end a coupling sheave 237. The coupling sheave 237 attaches the shaft 236 to the outer end of the righthand drive shaft 230 extending outwardly from each of the righthand and left-hand transport assemblies 94a and 94b, respectively. Each of the support blocks 233 is provided with an upstanding arm portion 238 which has attached thereto a pivot support block 239. The pivot support block is attached to the arm by means of bolts 240. The cushion subassembly, designated generally by the numeral 241, is pivotably mounted between the pivot support blocks 239—239 by means of shafts 242—242. The cushion subassembly includes a hydraulic damping cylinder 243 which contains a piston (not shown) having attached thereto a piston rod 244 which extends outwardly from the cylinder assembly. The outer end of the piston rod 244 is threadably received in clevis block 245 which is pivotably attached by pin 246 to arm 247 which is attached to the mid-portion of shaft 236 and is pinned thereto by means of a key (not shown) or other suitable means. The hydraulic fluid contained in the damping cylinder 243 passes back and forth from the portions of the cylinder divided by the piston through a conduit 248 which connects the left-hand and right-hand ends of the damping cylinder. A flow control valve 249 is provided in conduit 248 whereby the rate of flow of hydraulic fluid from the respective sides of the piston within the cylinder may be regulated to achieve the desired damping effect. When shaft 236 rotates counterclockwise from the position shown in FIG. 27, the piston rod forces the piston (not shown) from right to left forcing hydraulic fluid through conduit 248 from the rear of the cylinder 243 into the front of the cylinder. Flow control valve 249 opens completely to allow free flow of fluid through line 248 from the rear of the cylinder to the front of the cylinder. When arm 247 passes through the horizontal plane, i.e., through about 95 degrees travel, and continues downwardly, it causes the piston to move from left to right forcing the hydraulic fluid to flow from the front of the cylinder into the rear of the cylinder. When flow is from right to left, flow valve 249 is actuated to restrict the flow thereby damping rotation of shaft 236 to cushion the travel of the mold transport assemblies 47a and 47b. When the direction of travel of the mold transport assembly is reversed, the same sequence as described above occurs as shaft 236 is rotated clockwise. Thus, the travel of each of the mold transport assemblies is free over approximately the first half of its total travel and is cushioned over the last half of its travel.

OPERATION OF THE BLOW MOLDING APPARATUS

As pointed out hereinbefore, the blow mold apparatus of the present invention is particularly adapted for use with an extruder which is permanently affixed at the site of blow molding manufacturing operation. Blow molding apparatus 35 is preferably positioned in a setup room for attachment of the desired mold halves to the platens and for carrying out proper alignment operations prior to placing the blow mold apparatus on the pedestal assembly 169 which is located permanently immediately below the extruder head 47 at the manufacturing site where the portable blow molding appartus 35 is to be installed.

As seen in FIGS. 1–6, the first step in the setup operation for the blow molding machine is to set the blow molding apparatus with the components shown in the positions in FIG. 1, i.e., with the right- and left-hand transport and actuating assemblies 47a and 47b in the position at the blow station, i.e., underneath the blow assemblies 108-108. The left- and right-hand power assemblies 71—71 for closing the molds are positioned in the position shown in FIG. 1, i.e., with the platens in their maximum open position. The front platen adjust assembly 62 is then used to open the clearance space between the front platen 56 and the rear platen 59 of the blow mold machine to a sufficiently wide position to receive the blow mold halves 56a and 59a. The blow mold forward half 56a is attached to the front platen 56 by means of bolts, as described hereinbefore, and likewise the rear mold half 59a is attached to the back platen 59. The power assembly 71 for the respective transport assemblies is actuated to close the mold halves, being sure that the front platen adjust assembly has been actuated to provide sufficient clearance between the mating faces of the mold halves so that they will not be damaged when the mold or transport assembly is actuated. The front platen adjust assembly 62 is then used to move the tie bars 54 and 55 to position the front platen 56 to bring the engaging faces of the mold halves 56a and 59a into the proper contact, i.e., so that the mold halves close firmly. The next step in the setup operation is to position a jig between the blow assemblies 108—108 to simulate the location of the extruder head 47 with respect to the blow molding machine. The right-hand mold transport assembly 94a is then actuated to move the right-hand transport and actuating assembly 47a from the blow station, as shown in FIG. 1, to the parison pickup station, as seen in FIG. 15. As seen in FIGS. 4, 5, 6 and 25, the right-hand transport and actuating assembly is transversely adjusted by means of the adjust mechanism described hereinabove wherein the end 87 of the shaft 86 is rotated clockwise or counterclockwise to shift the power cylinder assembly 72 either forward or backward on the frame 49 of the transport and actuating assembly. When the power cylinder assembly 72 is moved, the interconnection between this assembly and the platens through tie bars 69a and 69b and 64a and 64b move the mold halves and the platens on which they are carried simultaneously backward or forward relative to the alignment jig, whereby the mold neck opening (not shown) is precisely centered below the jig which simulates the exact position of the parison as it is extruded from the extruder 47.

After the blow molds have been attached and all the foregoing alignment procedures have been carried out, the blow molding apparatus 35 is picked up on a forklift truck or a specially designed transport assembly, if desired, and is taken to the production line and placed on the pedestal 169. As described hereinbefore, the blow molding machine is elevated or lowered depending upon the relative positions of the blow molding machine and the extruder by utilizing the elevating mechanism connected to shaft 174 on the pedestal assembly. After the height has been adjusted to the position of the parison to be received within the blow mold halves, minor adjustments can be made in the Y- and Z-axes by making adjustments through shafts 196 and 204 to provide the proper alignment of the blow molding machine along the Y- and Z-axes with the extruder 47. The machine is then ready to be put into operation after connections are made to the electrical, pneumatic power and control systems that are provided.

Suitable electrical and pneumatic supply and control circuits are provided, which will be obvious to those skilled in the art. Suitable electrical circuits will provide the control sequences, for example, when driven by an electrical motor through a cam-electrical programmer switching setup to provide the proper sequential operations of the various mechanical and pneumatic components of the blow molding machine.

In operation, the extruder 47 is supplied with the particular type of resin to be used in extruding the parison from which the bottles are blown and continuously extrudes a parison from its head 47. Air is supplied through inlet conduit 73c to the pneumatic, double-acting power cylinder 72 which is a part of the right-hand transport power assembly 94a, thereby moving arms 98 and 99 from their rearward position shown in dotted outline in FIG. 16 to the forward position shown in full lines in FIG. 16. The right-hand transport and actuating assembly 47a moves across the frame 36 on the rails described hereinbefore. As seen in FIG. 15, as the right-hand transport and actuating assembly approaches the parison extrusion station, the wheels 48 supporting the assembly ride upwardly on the arcuately shaped end portion 44—44 of the forward rail section 43a and the rearward rail section 43b thereby elevating the assembly slightly. At the time the transport and actuating assembly reaches its maximum forward and maximum upward position, as shown in FIG. 15, the pneumatic and electrical control circuits actuate the power assembly for closing the mold 71 by admitting air to the pneumatic, doubleacting power cylinder 72. This causes the mold closing cam 90 to rotate thereby driving the push rods 64a and 64b and 69a and 69b outwardly as they are displaced by the roller bearing assemblies which are traveling in J-shaped slots 93a and 93b. Push rods 64a and 64b have their outer ends connected to the forward platen adjust assembly and interconnect through tie rods 54 and 55, whereby this assembly retracts the forward platen 56 inwardly toward the rear platen 59. At the same time, push rods 69 a and 69b force the rear platen 59 forward, thus, closing the blow mold halves 56a and 59b around the parison. As the cam 90 rotates clockwise, as seen in FIG. 4, the push-pull rods 69a and 69b and 64a and 64b are moved outwardly by the J-shaped cam surfaces 93a and 93b. At approximately 90 degrees of rotation, the mold halves 56a and 59a make contact. This 90 degrees of rotation is adjustable by the front platen adjust assembly 62. As the torque is applied to cam 90 through the power cylinder 72, the mold holding pressure is applied through the cam surfaces 93a and 93b. The cam surfaces 93a and 93b are generated to provide a slight outward movement as the cam 90 is rotated beyond 90°. This outward movement automatically adjusts the mold closing pressure for any wear within the mold transport and actuating assemblies 47a and 47b.

A knife assembly (not shown) severs the parison from the continuously extruded plastic tube issuing from the extruder head 47. When the molds are closed around the parison, the control assembly reverses the air flow to pneumatic assembly 72 in the right-hand transport assembly 94a, thereby causing the arms 99 and 98 to move to the right and move the right-hand transport and actuating assembly back over the rails to the blow station underneath the right-hand blow assembly 108. Right-hand transport assembly 47a then stops with the mold halves 56a and 59b in precise alignment with the blow pin assembly 117 of the blow assembly. Suitable control circuits supply pneumatic power to the double-acting power cylinder 109 of the blow assembly, thereby forcing the blow pin assembly 117 downwardly through the opening 122 in the stripper plate 124. Blow pin assembly 117 enters the open end of the hot parison and forces the parison against the neck portion of the mold and severs the neck moil portion therefrom as is conventionally done in the art. Suitable control mechanisms then inject blow air through the blow pin assembly 117, whereby the parison is expanded into the shape defined by the hollow interior of the mold.

If the mold halves carried by the platens are provided with a multiplicity of cavities, e.g., three cavities, the blow pin assembly detailed in FIGS. 12 and 13 may be utilized whereby three bottles may be blown in each set of mold halves. The blow pin assembly, as shown in FIGS. 12 and 13, functions in the same manner as that utilizing the single blow pin shown in FIGS. 8, 9, 10 and 11. A suitable cooling medium is circulated through the blow mold halves to chill the bottle until it becomes rigid. The timer then actuates the two-stage power cylinder 109 to lift the blow pin about 1/4th inch to keep from damaging the neck insert (not shown). The timer then actuates the power cylinder 72 on the mold closing assembly 72 to rotate the cam 90 in a counterclockwise direction opening the mold halves by reversing the process described hereinbefore for the closing of the mold halves. The second stage of cylinder 109 then is activated to strip the blown bottle and neck moil off the blow pin 117 by means of stripper plate 124. The blown bottle then drops out of the open blow mold into a storage box or into a conveyor belt, as desired.

The left-hand transport and actuating assembly 47b is programmed to move from its blow station position shown in FIGS. 1 and 2 into the parison-receiving position when the right-hand transport assembly begins its movement away from the parison extrusion station back to its blow station. The two mold transport assemblies function on an alternate cycle, whereby one mold transport assembly is picking up a parison and traveling back to its blow station while the other transport assembly is at the blow station undergoing the blowing and cooling process.

From the foregoing it can be seen that the blow molding apparatus of the present invention provides a highly flexible, versatile machine which can be set up in a position different from the extruder position and wherein certain portions of the machine may be adjusted or repaired without tying up an extruder. The setup and alignment procedures can be carried out and then the machine moved to the extruder, whereby little time is lost on a particular extruder line. The blow molding apparatus provides a large degree of flexibility whereby molds of various sizes may be quickly positioned within the platens attached thereto and lined up for positioning under the extruder.

While there has been described what is considered a preferred embodiment of the blow molding machine of the present invention, it is understood that many obvious variations will occur to those skilled in the art. The scope of the invention is to be limited solely by the following claims.

What is claimed is:

1. In an apparatus for extrusion blow molding plastic containers:
   a. means supplying downwardly extruded, tubular parisons of moldable plastic material at a parison supply station;
   b. a first means for transversely moving with respect to the axis of said parisons a first pair of blow mold halves to said parison supply station to receive a first parison and to return said parison to a first blow station;

c. a second means for transversely moving with respect to the axis of said parisons a second pair of blow mold halves to said parison supply station to receive a second parison and to return said parison to a second blow station;

d. means carried by said first and said second means for transversely with respect to the axis of said parisons moving said first and second pair of blow mold halves for opening and closing said blow mold halves;

e. a first fixedly mounted blow assembly positioned to engage said first pair of blow mold halves at said first blow station to expand the enclosed parison;

f. a second fixedly mounted blow assembly positioned to engage said second pair of blow mold halves at said second blow station to expand the enclosed parison;

g. the assemblies and means of subparagraphs b) through f) being mounted on a portable first support means which is separate from second support means on which the means of subparagraph a) is mounted; and h. third support means for supporting said first portable support means, said third support means being adjustable to position said first portable support means in relation to said second support means.

2. In the blow molding apparatus of claim 1 wherein each of said first and second means for transversely moving said first and second pairs of blow molds includes a blow mold transport assembly mounted on a pair of spaced apart tracks attached to said portable first support means whereby said transport assembly may be reciprocally moved.

3. In the blow molding apparatus of claim 2 wherein the reciprocal movement of each of said blow mold transport assemblies is in a straight line over a substantial portion of their movement.

4. In the blow molding apparatus of claim 3 wherein said blow mold transport assemblies move in an upwardly directed, curved path over the terminal portion of their travel as they approach the parison supply station.

5. In the blow molding apparatus of claim 3 wherein each of said transport assemblies includes fluid powered means for opening and closing said blow mold halves.

6. In the blow molding apparatus of claim 5 wherein said fluid powered means includes means for converting linear motion into rotary motion.

7. In the blow molding apparatus for claim 6 wherein said fluid is compressed air.

8. In the blow molding apparatus of claim 6 wherein said fluid powered means includes a cam and at least two cam followers engaging said cam.

9. In the blow molding apparatus of claim 8 wherein one of said cam followers is coupled to one of said mold halves and the other of said cam followers is coupled to the other of said mold halves.

10. In the blow molding apparatus of claim 1 wherein said portable first support means is a rigid support frame.

11. In the blow molding apparatus of claim 10 wherein said tracks are carried by the upper portion of said rigid support frame assembly.

12. In the blow molding apparatus of claim 10 wherein said support frame is removably attached to said third support means which includes means to raise and lower said support frame.

13. In the blow molding apparatus of claim 11 wherein a fluid powered reciprocating assembly is mounted on said support frame below said transport assembly and is coupled to said transport assembly.

14. In the blow molding apparatus of claim 13 wherein said support frame is removably attached to said third support means which includes means to raise and lower said support frame.

* * * * *

UNITED STATES PATENT OFFICE
CERTIFICATE OF CORRECTION

PATENT NO. : 3,860,375
DATED : January 14, 1975
INVENTOR(S) : William G. Kinslow, Jr. et al It is certified that error appears in the above-identified patent and that said Letters Patent are hereby corrected as shown below:

Col. 9, line 56 reads "73b", should read --73a--. Col. 11, line 27 reads "depictd", should read --depicted--. Col. 11, line 37 reads "cylinder", should read --cylindrical--. Col. 11, line 39 reads "125", should read --135--. Col. 12, line 29 reads "85", should read --185--. Col. 12, line 40 reads "assembly", should read --subassembly--. Col. 18, line 18 reads "72", should read --71--.

Signed and Sealed this sixteenth Day of September 1975

[SEAL]

Attest:

RUTH C. MASON
Attesting Officer

C. MARSHALL DANN
Commissioner of Patents and Trademarks